B. L. WOODLAND.
PISTON.
APPLICATION FILED NOV. 4, 1919.
1,381,047.
Patented June 7, 1921.
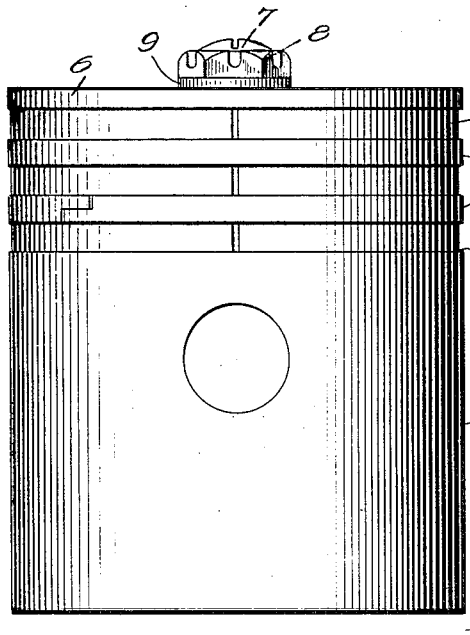
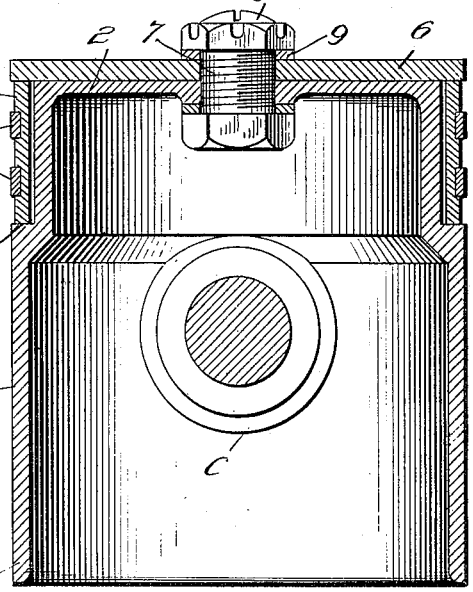
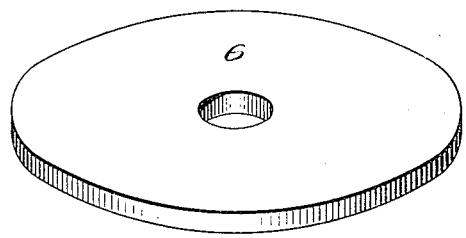
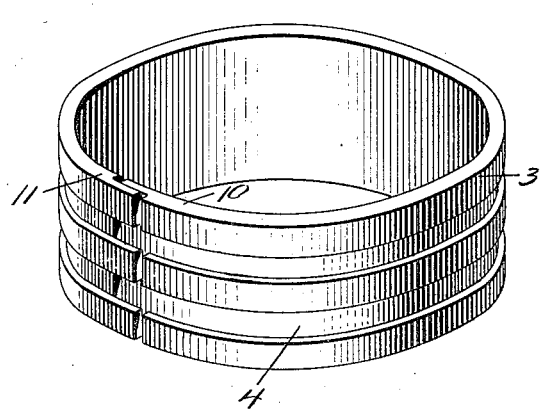
Inventor
Bert L. Woodland.
By Geo. P. Kimmel
Attorney

UNITED STATES PATENT OFFICE.

BERT L. WOODLAND, OF MUSKEGON, MICHIGAN.

PISTON.

1,381,047.  Specification of Letters Patent.  Patented June 7, 1921.

Application filed November 4, 1919. Serial No. 335,640.

*To all whom it may concern:*

Be it known that I, BERT L. WOODLAND, a citizen of the United States, residing at Muskegon, in the county of Muskegon and State of Michigan, have invented certain new and useful Improvements in Pistons, of which the following is a specification.

This invention relates generally to improvements in pistons for internal combustion engines, and more particularly to means for preventing carbonization of the lubricating oils upon the pistons and in the cylinder head.

Furthermore the invention is designed to prevent loss of compression due to leakage between the pistons and cylinder walls, and to accomplish this end a spring collar is provided beneath the piston rings whereby to insure positive frictional contact of the rings with the cylinder walls at all times.

The primary object of the present invention is to provide an improved adjustment of the collar member shown in my pending application on piston construction, filed December 9, 1918, Serial No. 265,955, in order to take up any discrepancies in the fit of the collar upon the piston sleeve which might occur through end wear of the collar.

Another object of the present invention is to improve upon the construction of the collar shown in prior application with particular reference to effecting a positive leak-proof closure between the meeting ends of the collar and piston rings and to accomplish this result I have so constructed the collar of the present invention that the piston rings will effect the leak-proof closure above mentioned.

Other objects as well as the nature, characteristic features and scope of this invention will be more readily apparent from the following description taken in connection with the accompanying drawings and pointed out in the claims, forming a part of this specification.

The invention is clearly illustrated in the accompanying drawings, in which:—

Figure 1 is a side elevation thereof.

Fig. 2 is a sectional side elevation.

Fig. 3 is a perspective view of the adjusting washer of the invention, and

Fig. 4 is a perspective view of the collar showing the advantage of the arrangement of the meeting ends thereof.

Like characters indicate like or similar parts throughout the several views of the drawings, and in which A designates the sleeve portion of a piston generally designated by B and having bosses C for mounting the usual piston rod (not shown).

The particular piston B herein shown is provided with an annular reduced portion 1 adjacent its head 2 for the reception of a split annular collar 3 having spaced annular grooves 4 for the reception of piston rings 5 formed of copper or other suitable material. The collar 3 is formed of spring metal and has a tendency to spring outwardly to insure forcing the piston rings 5 to bear against the walls of the cylinder to prevent leakage. Furthermore the upper edge of the collar 3 lies flush or slightly above the outer periphery of the piston head 2 and is engaged by a washer plate 6 secured upon the head through the medium of a bolt 7 provided with a suitable locking nut 8. It is pointed out that the peripheral edge of the washer or plate 6 extends outwardly substantially flush with the piston rings 5 to coöperate with the rings in preventing leakage. Usually it is found desirable to form the plate or washer 6 of steel and it is obvious that upon tightening the nut 8 down thereupon that the collar will be prevented from any movement longitudinally of the piston 3. Furthermore if any looseness of the collar in the reduced portion 1 occurs through wear the piston head 2 may be ground down or filed until the washer or plate 6 exerts its usual binding action. In order to prevent any leakage between the cylinder head and the pistons through the opening provided for the bolt 7 a pair of washers formed of copper 9 are arranged in the manner clearly shown in Fig. 2 of the drawing.

Referring particularly to Fig. 4 of the drawing wherein is illustrated the collar *per se*, the ends of the webs 10 and 11 between the piston ring grooves 4 are oppositely cut away to overlap so that upon disposition of the piston rings 5 therebetween a positive closure is effected to prevent leakage of oil while the spring action of the collar and piston rings will in no way be impaired or decreased.

It is thought that the operation of the present invention will be clearly understood from the foregoing description, but it is particularly pointed out that any possible movement of the collar within the reduced portion of the piston head will be prevented by the washer or plate 6 eliminating possible leakage between the cylinder head and the piston.

More slight changes might be made in the general form and arrangement of parts described without departing from the spirit of my invention and hence I do not limit myself to the precise details set forth but consider myself at liberty to make such changes and alterations as fall within the spirit and scope of the appended claims.

What I claim as new and desire to secure by Letters Patent is:

1. In a piston construction, a cylindrical body having a reduced portion adjacent one end thereof, a split spring collar in the reduced portion having piston ring grooves, an adjustable plate on the body and bearing against the collar for preventing longitudinal movement of the collar in the reduced portion relative to the body, the meeting ends of the webs or portions between and outside the grooves of the collar being oppositely cut away and overlapping, and piston rings in said grooves of the collar for preventing leakage between the cylinder head and the piston.

2. In a piston construction, a cylindrical body having a reduced portion adjacent one end thereof, a split spring collar mounted on said reduced portion and having piston ring grooves in the outer face thereof, the ends of the webs between the piston ring grooves being oppositely cut out on their inner and outer faces to overlap to effect a positive closure.

In testimony whereof, I affix my signature hereto.

BERT L. WOODLAND.